April 10, 1928.  W. KÜSTERS  1,665,667
LIQUID LEVEL INDICATOR
Filed Feb. 17, 1925
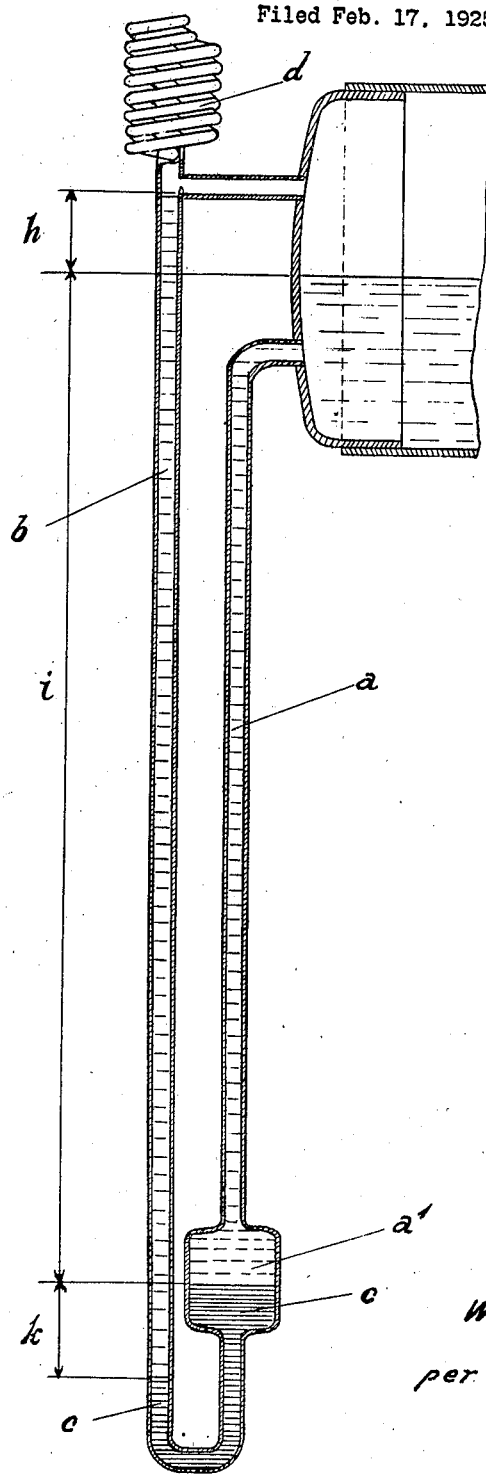
Inventor:
Wilhelm Küsters
per
Attorney Patented Apr. 10, 1928.

1,665,667

UNITED STATES PATENT OFFICE.

WILHELM KÜSTERS, OF AACHEN, GERMANY.

LIQUID-LEVEL INDICATOR.

Application filed February 17, 1925, Serial No. 9,860, and in Germany February 29, 1924.

This invention relates to liquid-level distance-indicators more particularly designed for use in connection with high-lying tanks containing liquids, such as for instance steam boilers, and comprising a gauge arranged at a low point by using connecting pipes extending down to such point.

In adhering to the use of an indicating liquid the specific weight of which is greater than that of the tank liquid, I have made out by tests and calculation that, when using an indicating liquid the specific weight of which is double as high as that of the tank liquid, I obtain in the low-lying gauge of the distance-indicator an accurate reproduction of the liquid-level displayed in an ordinary ndicator; the difference of height between the two surfaces of the indicating liquid being the same as the difference of height between the surfaces of the liquid in the tank or boiler and in the pipe leg connected to the air or steam space of the tank or boiler. The arrangement of the gauge proper at a low point securely avoids dangerous errors in reading off the indicator, inasmuch as the stoker has always before his eyes the liquid-level in its real size and thus needs not determine it by the aid of numbers of ratio.

If it should be difficult to procure, f. i. for steam boilers a suitable indicating liquid the specific weight of which is exactly 2, the gauge or indicating vessel containing the liquid may be arranged at an incline in order to obtain between the two surfaces of the indicating liquid a distance corresponding to the difference of height between the water surface in the boiler and that in the pipe leg connected to the steam space of the boiler.

The invention will now be described with reference to the accompanying drawing which illustrates, as an embodiment of the invention, a water-level indicator for a steam boiler.

The water-level indicator consists of a U-shaped pipe $a$, $b$, the leg $a$ of which is connected to the boiler below the water surface while its leg $b$ is connected to it above the water surface. The two pipe legs are entirely filled with water. Interposed between the water columns of the two pipe legs at the lowest point, at which they are connected with each other, is an indicating liquid $c$ the specific weight of which is double or approximately double as high as that of the water so that the liquid $c$ always retains its position between the two water columns.

A cooling device $d$ arranged above the leg $b$ causes the condensation of so much steam that the leg $b$ is always completely filled with water. When using an indicating liquid with the specific weight 2, the difference of height between the two columns of the indicating liquid $c$ corresponds exactly to the difference of height between the surface of the water in the boiler and the point of connection of the pipe leg $b$ with the boiler.

This fact is easily to be proven in connection with the drawing. Let $h$ be the vertical distance between the planes of the free surfaces of the water respectively in leg $b$ and in the boiler, $i$, the vertical distance between the plane of the horizontal surface of the liquid in the boiler and that of the indicating liquid in leg $a$, and $h$, the vertical distance between the levels of the indicating liquid in the respective legs, all as indicated in the drawing. It is proposed that the specific weight of the boiler liquid in the pipe branches $a$ and $b$ is 1. Let the specific weight of the indicating liquid be $x$, then $$i.1 + k.x = h.1 + i.1 + k.1$$
$$i + k.x = h + i + k$$
$$k.x = h + k$$

For $$h = k,\ k.x = 2k$$
$$x = 2$$

In an ordinary boiler plant the specific weight of the water in the pipe branches $a$ and $b$ is 0.95. The specific weight of the indicator liquid must correspondingly be 1.9.

The pipe leg $a$ is provided with an enlargement $a^1$ lying in the range of the variations of the surface of the indicating liquid. The variations may therefore be read from the pipe $b$ with sufficient accuracy.

Any liquid which does not enter into diffusion with water or other liquids, may be used as indicating liquid. Satisfactory results have been attained with ethylene-bromide of the specific weight 2.

Having thus described my invention, what I claim as new and desire to secure by Letters-Patent, is:—

A liquid level indicator for the water in steam boilers, comprising a pipe having a U-bend at a point below the boiler and one leg of the bend being in open communication with the water-containing space of said boiler and the other leg with the space above said water, said legs containing independent columns of water between which is interposed at the bend an indicating liquid having a specific weight which is approximately double that of the water.

In testimony whereof I have signed my name to this specification.

WILHELM KÜSTERS.